United States Patent
Faust, Jr. et al.

(10) Patent No.: US 9,315,715 B2
(45) Date of Patent: *Apr. 19, 2016

(54) METHOD OF REDUCING THE VISCOSITY OF HYDROCARBONS

(75) Inventors: Marcus D. Faust, Jr., Missouri City, TX (US); Thomas M. Weathers, Jr., Katy, TX (US); Duy T. Nguyen, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/582,329

(22) Filed: Oct. 20, 2009

(65) Prior Publication Data

US 2011/0092393 A1  Apr. 21, 2011

(51) Int. Cl.
| | |
|---|---|
| *C09K 8/52* | (2006.01) |
| *C09K 8/584* | (2006.01) |
| *C09K 8/60* | (2006.01) |
| *C09K 8/90* | (2006.01) |
| *F17D 1/16* | (2006.01) |

(52) U.S. Cl.
CPC . *C09K 8/584* (2013.01); *C09K 8/52* (2013.01); *C09K 8/604* (2013.01); *C09K 8/90* (2013.01); *F17D 1/16* (2013.01)

(58) Field of Classification Search
USPC ......... 507/209, 211, 212, 213, 214, 216, 217, 507/246, 261; 166/304
See application file for complete search history.

(56) References Cited

U.S. PATENT DOCUMENTS

| | | | |
|---|---|---|---|
| 2,582,323 A | | 1/1952 | Fischer |
| 3,378,074 A | * | 4/1968 | Kiel ................... C09K 8/64 137/13 |
| 3,679,582 A | * | 7/1972 | Wagenaar ............... 507/90 |
| 3,893,510 A | * | 7/1975 | Elphingstone ........ E21B 33/138 166/275 |
| 4,228,277 A | | 10/1980 | Landoll |
| 4,529,523 A | | 7/1985 | Landoll |
| 4,744,865 A | | 5/1988 | Dreisbach et al. |
| 4,788,001 A | | 11/1988 | Narula |
| 5,669,456 A | | 9/1997 | Audibert et al. |
| 7,041,707 B2 | | 5/2006 | Hahn |

(Continued)

FOREIGN PATENT DOCUMENTS

| | | |
|---|---|---|
| EP | 1033471 | 9/2000 |
| EP | 1961799 | 8/2008 |

(Continued)

OTHER PUBLICATIONS

R. Simon, W.G. Poynter, Down-Hole Emulsification for Improving Viscous Crude Production, Journal of Petroleum Technology, Dec. 1968, pp. 1849-1853.

(Continued)

*Primary Examiner* — John J Figueroa
(74) *Attorney, Agent, or Firm* — Senniger Powers LLP

(57) ABSTRACT

Methods of treating hydrocarbon fluids to reduce the apparent viscosity of hydrocarbon fluids encountered in petroleum operations and reducing deposits within a well annulus or a pipeline are disclosed. The method comprises contacting such fluids with a hydrophobically modified polysaccharide to create water external emulsions. The disclosed hydrophobically modified polysaccharides have been demonstrated to reduce interfacial tension to below 65 mN/m and thereby improve the transportability of inherently viscous hydrocarbon fluids, such as heavy crude oils.

20 Claims, 3 Drawing Sheets

(56) References Cited

U.S. PATENT DOCUMENTS

2004/0072946 A1      4/2004    Eagland et al.
2009/0186796 A1      7/2009    Gomez Ruiz et al.

FOREIGN PATENT DOCUMENTS

GB        1188781       4/1970
WO      2005/040669     5/2005

OTHER PUBLICATIONS

G.G.McClaflin, C.R. Clark, T.R. Sifferman, The Replacement of Hydrocarbon Diluent With Surfactant and Water for the Production of Heavy, Viscous Crude Oil, Journal of Petroleum Technology, Oct. 1982, pp. 2258-2264.

C.M. Des Brisay, D.W. Mudie, F.M. Mourits, L. Kurucz, Pumping heavy oils with the aid of downhole oil-in-water emulsifications, The Journal of Canadian Petroleum Technology, Mar.-Apr. 1989, pp. 80-84. vol. 28. No. 2.

L.E. Sanchez, J.L. Zakin, Transport of Viscous Crudes as Concentrated Oil-in-Water Emulsions, Ind. Eng. Chem Res., 1994, pp. 3256-3261, vol. 33, No. 12.

C.Viebke, J. Meadows, J.C. Kennedy, P.A. Williams, Effect of Soluble Polymers on the Shear and Extensional Viscolsity Characteristics of a Concentrated Latex Dispersion, Langmuir, 1998, pp. 1548-1553, 14.

S.S.K. Sim, E.O. Udegbunam, D.J. Haggerty, J.J. Baroni, M. Baroni, Laboratory Experiments and Reservoir Simulation Studies in Support of Co2 Injection Project in Mattoon Field, Illinois, USA, The Journal of Canadian Petroleum Technology, Feb. 1996, pp. 25-32, vol. 35.

B.M.Yaghi, A. Al-Bemani, Heavy Crude Oil Viscosity Reduction for Pipeline Transportation, Energy Sources, 2002, . 93-102, 24.

\* cited by examiner

METHOD OF REDUCING THE VISCOSITY OF HYDROCARBONS

TECHNICAL FIELD

This invention relates generally to methods of reducing viscosity of hydrocarbons encountered in petroleum operations. More specifically, the invention relates to methods of enhancing the recovery and transport of heavy petroleum oils. These methods include using hydrophobically modified non-ionic polysaccharide materials as viscosity reducers in petroleum applications. The invention has particular relevance to contacting such materials in heavy crude oil applications to create simple or complex emulsions thereby reducing the apparent viscosity of the hydrocarbons to increase transport efficiency.

BACKGROUND

Of the worlds proven oil reserves, over half are considered heavy oil (generally defined as having an API gravity of 20 or less) and many of these are new production areas with rapidly evolving technology and new demands. One of the most challenging aspects of such heavy oil production is the transport of these highly viscous fluids. Transport of viscous fluids along pipelines for crude oil production, delivery to a refinery, or other storage facility presents a myriad of challenges. One major challenge is recovering and transporting high viscosity petroleum products from well sites to refineries or storage facilities. Transport may be hindered by multiple variables, including diffusion rates of fluids, pressure drops across flow lines, pressure limits of equipment, changing temperatures due to environment, and fluid density, to name a few. These factors and others can, for example, limit production, cause differed production, and require additional equipment due to high fatigue and failure rates. In many proven petroleum-containing sites, very little petroleum may be obtained by known means because of the high viscosity of the petroleum products.

When extracted from the subterranean formation, viscous oil must be transported from the field to a refinery or shipping terminal. Various techniques are known for aiding in the recovery of viscous petroleum and facilitating its transport to a refinery, storage site, or other location. These techniques include, for example, mechanical pumping, mechanical pumping combined with steam injection, mining, heating, and addition of low viscosity diluents (e.g., heavy aromatic naptha distillates, sometimes referred to as "HAN"). Pumping unit limitations have a negative impact on the economics of producing viscous, oil from pumped wells found in many parts of the world. The high viscosity of these crude oils results in low pump volumetric efficiency, reduced flow rates, and high flow pressure drop. Heat and steam have additional costs associated with energy input and diluents have transport and recycling costs.

Heavy oils exhibit a viscosity generally from 10,000 to 500,000 cP at room temperature. As a result, according to current practice pumping and heating stations are used to maintain a low viscosity for transport along pipelines. However, prolonged pumping interruptions often occur resulting in cold crude oil with concomitant plugging of pipes and pumps. Insulating hundreds of miles of pipe to reduce heat loss is usually cost prohibitive. Heating the crude oil likewise consumes a large amount of energy and is cost ineffective. Diluents (e.g., HAN, fuel oil, and kerosene) are sometimes used to reduce viscosity for pumping and transport. However, the large amount of diluent required is not always readily available in the production area and, furthermore, in existing practices the diluent has to be recovered at the fluid delivery site and pumped back to the field over great distances.

Current production of heavy oils from the subterranean formation to the processing facilities results in significant pressure drop, fatigue of pumping equipment, and low fluid production rates due to the high viscosity of the crude oil component of the production fluid. There thus exists an ongoing need for unproved methods to decrease the viscosity of hydrocarbons to improve pump performance and operating efficiency thereby enhancing production. There exists a specific need for enhancing recovery and transport of viscous and extremely viscous petroleum such as that found in heavy oil reservoirs and other deposits.

SUMMARY

This invention accordingly relates to improved methods of reducing the apparent viscosity of hydrocarbon fluids encountered in petroleum operations to facilitate the flow of such fluids between two locations. In a preferred aspect, the invention relates to reducing the viscosity of petroleum products, such as heavy oil and crude oils, to facilitate its transport out of the subterranean formation or between the site of recovery (e.g., oil well) and a refinery or storage facility. In another preferred aspect, the present invention is a method for the preparation of low-viscosity oil in water emulsions from viscous oils. These emulsions, in turn, will increase the oil production and provide a cost-effective alternative to heated pipelines or diluents for transportation of heavy oil.

This invention provides methods of application for hydrophobically modified polymers capable of creating a water external emulsion to reduce the apparent viscosity of the hydrocarbon fluids. Such polymers are preferably derived from polysaccharides and are non-ionic. They are added with an amount of water to a hydrocarbon fluid to create the emulsion.

In an aspect, the invention utilizes hydrophobically modified non-ionic polysaccharides in a method for reducing the apparent viscosity of a hydrocarbon fluid encountered in petroleum operations. The method comprises contacting said hydrocarbon fluid with an effective emulsifying amount of a composition having at least one hydrophobically modified non-ionic polysaccharides with the general formula below.

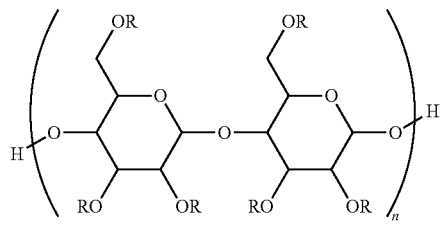

Each R is independently selected from the group consisting of hydrogen (H), alkyls, aryls, hydroxyalkyls, moieties having alkoxy groups, and combinations thereof; and n is from about 5 to about 5,000.

It is an advantage of the invention to provide a novel method of reducing pressure drops observed in transporting heavy and viscous crude oil resulting in increased production and improved efficiency of recovering oil from oil in water emulsions after transport.

Another advantage of the invention is to provide well clean-up and removal of heavy deposits in the well bore to further enhance production.

An additional advantage of the invention is to provide a method for the formation of low apparent viscosity water external emulsions that can be separated into dry oil and water upon exposure to emulsion breaking chemical and/or heat.

It is another advantage of the invention to provide a novel method of reducing the apparent viscosity of hydrocarbon fluids encountered in petroleum operations to facilitate transfer of such fluids to refineries or other storage sites.

It is a further advantage of the invention to provide a method forming oil-in-water emulsions by contacting the disclosed polymer composition with hydrocarbon fluids encountered in petroleum operations thereby reducing the apparent viscosity of the hydrocarbon fluids and increasing transport efficiency.

An additional advantage of the invention is to provide a novel method that obviates the need for diluents and heated pipelines in the transport of hydrocarbon fluids encountered in petroleum operations.

Another advantage of the invention is to reduce equipment wear, increase oil production, extend reservoir production lifetime, and generally increase production efficiency and oil quality.

An additional advantage of the invention is to provide a method of reducing deposits within a well annulus or a pipeline.

A further advantage of the invention is to provide enhanced separation of oil and water based upon a synergistic effect resulting from lower water content emulsions and reduced emulsion breaker chemical usage.

It is yet another advantage of the invention to provide methods of reducing the apparent viscosity of hydrocarbon fluids encountered in petroleum operations that are able to function with lower foaming than prior art surfactants and that are immune to the salinity levels of the water in the system.

Additional features and advantages are described herein, and will be apparent from, the following Detailed Description, Examples, and Figures.

DETAILED DESCRIPTION

Figure 1:
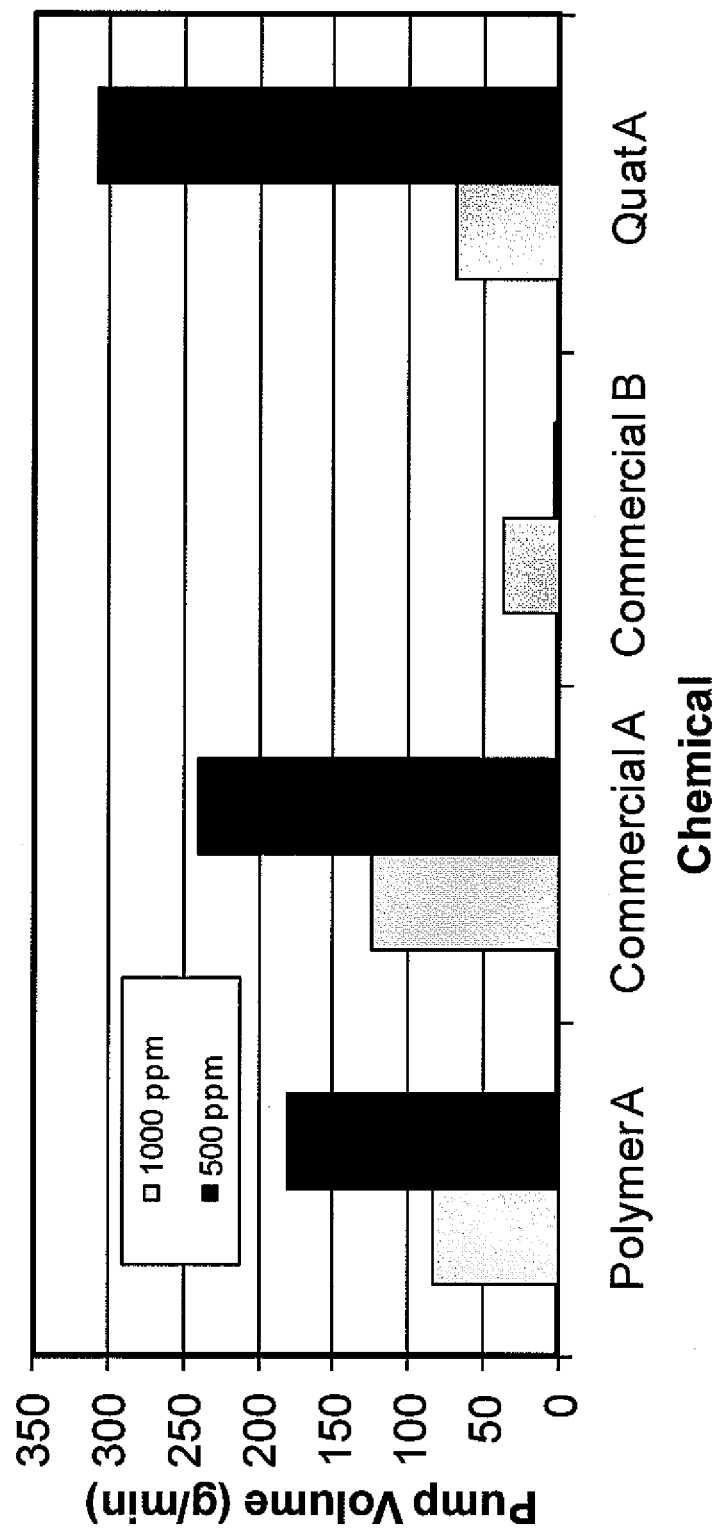
FIG. 1 shows comparative flow loop fluid pump rates.

The following definitions and any other definitions herein are intended to be clarifying and are not intended to be limiting.

"Alkyl" refers to a monovalent group derived from a straight/linear or branched chain saturated hydrocarbon by the removal of a single hydrogen atom. Representative alkyl groups include methyl; ethyl; n- and iso-propyl; n-, sec-, iso-, and tert-butyl; $C_5$ to $C_{12}$ groups; 2-ethyl-hexyl; myristyl ($C_{14}$); palmityl ($C_{16}$); stearyl ($C_{18}$); oleiyl ($C_{18}$ mono-unsaturated); eicosanyl ($C_{20}$); heneicosanyl ($C_{21}$); docosyl (behenyl, $C_{22}$); tricosanyl ($C_{23}$); tetracosanyl ($C_{24}$); pentacosyl ($C_{25}$), 3-, 7-, and 13-methylhexadecanyl; and the like. Preferred alkyls include n-butyl, hexyl, heptyl, octyl, decyl, dodecyl, ($C_4$ to $C_{12}$), lauryl, myristyl, palmyl, stearyl, oleyl, and behenyl.

"Alkoxy" refers to an alkyl-O— group where alkyl is defined herein. Representative alkoxy groups include methoxy, ethoxy, propoxy, butoxy, and the like.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl, naphthyl, substituted phenyl, substituted naphthyl, and the like.

"Hydroxyalkyl" refers to an alkoxy group with an additional pendant hydroxyl group of the alkyl group (e.g., 2-hydroxy ethyloxy) where alkoxy is defined herein. Representative hydroxyalkyl groups include 2-hydroxyethyl, 2-hydroxypropyl, 2-hydroxybutyl, 2-hydroxypentyl, 2-hydroxyhexyl, 2-hydroxyheptyl, 2-hydroxyoctyl, 2-hydroxynonyl, 2-hydroxydecyl, 2-hydroxyundecyl, 2-hydroxydodecyl, 2-hydroxytetradecyl, 2-hydroxyhexadecyl, 2-hydroxyoctadecyl, 2-hydroxyoleyl, 2-hydroxyeicosanyl, 2-hydroxydocosyl, 3-hydroxypropyl, 4-hydroxybutyl, 5-hydroxypentyl, 6-hydroxyhexyl, 7-hydroxyheptyl, 8-hydroxyoctyl, 10-hydroxydecyl, 12-hydroxydodecyl, and the like. Preferred hydroxyalkyl groups include 2-hydroxybutyl, 2-hydroxypentyl, 2-hydroxyhexyl, 2-hydroxyheptyl, 2-hydroxyoctyl, 2-hydroxynonyl, 2-hydroxydecyl, 2-hydroxyundecyl, 2-hydroxydodecyl, 2-hydroxytetradecyl, 2-hydroxyhexadecyl, 2-hydroxyoctadecyl, 2-hydroxyoleyl, 2-hydroxyeicosanyl, and 2-hydroxydocosyl.

Preferably, the method of the invention includes contacting the hydrocarbon fluid with one or more of the described polymers to facilitate transport of the fluid along a fluid flow path to a refinery or other storage site. In another embodiment, the invention includes a method of reducing deposits within a well annulus or a pipeline. Preferably, the invention relates to an enhanced process for reducing the apparent viscosity of hydrocarbons such as heavy oil and crude oils. The present invention involves contacting the polymers herein described with a hydrocarbon fluid to convert the hydrocarbon fluid from high viscosity oil or water-in-oil emulsions to low viscosity oil-in-water emulsions or complex water external emulsions, resulting in increased productivity.

The method of this invention has the capability to reduce the pressure drop observed in transporting heavy viscous crude oil by reducing the apparent viscosity of the production fluids. A concomitant increase in production is typically observed with such decreases in viscosity and pressure. Generally, levels of at least 20 percent and in some cases greater than 50 percent production have been observed. (see Simon, R. and Poynter, W. G. *J. Petroleum Tech.* 1968, p. 1349-1353; McClaflin, G. G., Clark, C. R. and Sifferman, T. R. *J. Petroleum Tech.* 1982, p. 2258-2264; Des Brisay, C. M., Mudie, D. W. *J. Can. Pet. Technol.* 1989, p. 80-84).

In one embodiment, the invention provides a transport mechanism where the production fluid is emulsified into the internal phase of an oil-in-water emulsion by adding water and a polymeric surfactant to the production fluid followed by mixing of all components. The resulting emulsion has an apparent viscosity much closer to water and as such has greatly reduced drag coefficient, which in turn reduces the pressure drop as fluids are pumped to, for example, processing facilities.

This invention provides novel methods of applying aqueous solutions of the described polymers to a hydrocarbon solution to create a water external emulsion to reduce the apparent viscosity of the fluid. The emulsion can be broken and emulsified fluids can be separated into aqueous and hydrocarbon fractions, for example, by heating the emulsion to a temperature at which the acetal linkages in the non-ionic polymer hydrolyze in the presence of water to modify the polymer interaction at the oil/water interface. Other emulsion breaker chemicals and/or specialized oxidizers or enzymes may also be used to break the emulsion, as well combinations of the disclosed and other suitable methods.

Adding water and a polymeric surfactant to production fluid with low shear mixing emulsifies the production fluid into the internal phase of an oil-in-water emulsion. The resulting emulsion has an apparent viscosity much closer to water and as such has a greatly reduced drag coefficient, reducing the pressure drop as fluids are pumped to the processing facilities.

In one embodiment, hydrocarbons are present in a subterranean formation and the polymers of the invention are delivered into the subterranean formation to create the lower apparent viscosity hydrocarbon. Such delivery may take place via injection through an injection well or any other suitable delivery method, and may also be accompanied by other treating agents, such as permeability-modifiers like those disclosed in U.S. Pat. No. 6,454,003 B1, "Composition and Method for Recovering Hydrocarbon Fluids from a Subterranean Reservoir."

Emulsification of the produced fluids with the hydrophobically modified polymers of the invention and water in the wellbore generally requires an amount of shear force. The shear force can result from a mechanical force such as mixed fluids going through a downhole pumping system or from a static influence such as the intrinsic shear created by flow through the pipe of the production string or a dynamic shear force, such as gas bubbles from gas injection or reduced pressure transitioning through the gas bubble point. The shearing forces present will influence the amount of fluid mixing as well as droplet formation and droplet size. The type of emulsion (e.g., water-in-oil or oil-in-water) can also be influenced by the amount of shear and is well documented in the literature (see Salager, J.-L.; Briceno, M. I.; Bracho, C. L. *Heavy hydrocarbon Emulsions: Making Use of the State of the Art in Formulation Engineering* in Encyclopedic Handbook of Emulsion Technology J. Sjöblom ed., Marcel Dekker, New York, 2001). For the purposes of this application the more favorable conditions are those with lower shear, though there is a minimum amount of shear required for fluid mixing.

It should be appreciated that any suitable method may be chosen and utilized by a skilled artisan in applying the invention. In a preferred embodiment, delivery of the hydrophobically modified polymer of the invention is most effective as a fully hydrated solution. The polymer solution can be freezing point depressed using high salt brines without affecting the performance of the chemical if delivered as the salt precipitated version of the polymer, which is a slurry that is rapidly re-hydrated with fresh water and some shear force in the liquid. A large number of salts are envisioned to be acceptable for use in this application. The particular salt used will be chosen by the skilled artisan. Representative salts include ferrate, ferrite, magnesium, calcium, sodium, potassium and ammonium cations in combinations with formate, carbonate, chloride, bromide, hydroxide, sulfide, and the like.

In another embodiment, a dry powder version may also be used, but generally requires a pre-treatment system that creates sufficient shear force and provides sufficient time in water to hydrate the polymer prior to its delivery to the oil/water interface. Chemical delivery to crude oil production may be through a batch or continuous treatment of the chemical down the back side of the production tubing or through a capillary tubing string. An alternate delivery method is to use a slip-stream method to send produced water with some residual oil and non-ionic surfactant back down-hole. This slip-stream method has the benefit of reducing overall chemical usage as some of the chemical would be recycled in the system with the recycled water from the slip-stream. An alternate delivery system would be top-side delivery, wherein the chemical and water are added to the production fluid downstream of the production wellhead at a point that would create emulsion for the flow transfer lines between satellite wells and the central fluid processing station. This alternate would also work for emulsification of fluids that have been processed and are to be shipped to refineries.

In a further embodiment, treatment of the formed emulsion and separation of the water from the oil typically goes through a multiple stage separation that has a free water knock-out (FWKO) followed by a heat treating vessel. This heat treatment vessel and the FWKO can both be heated and as such either can trigger the inversion of a non-ionic polymer, resulting in destabilization of the emulsion. In addition, the chemically induced emulsion may be treated with enzymes or oxidative chemicals to cleave cellulosic materials at the ether linkage of the sugars, thus destabilizing the emulsion. The use of enzymatic or oxidative treatments to break down polysaccharides is well documented for fracture fluids using, for example, guar gums, xanthan gums, and other polysaccharides.

In an embodiment, the polymer of the invention has an inversion temperature of about 40° C. The disclosed polymer has constrained hydrophobic motifs that upon heating uncoil from intramolecular interactions to be hydrophobic domains in water. The hydrophobes can then re-associate with other molecules to create intramolecular interactions. The resulting behavior typically creates a hazy or cloudy solution. The adjustment of inversion temperature is readily accomplished by adjusting the polymer content of specific moieties such as 2-hydroxypropyl groups derived from propylene oxide. In an alternative embodiment, the polymer of the invention does not have an inversion temperature at atmospheric pressure.

In an embodiment, the emulsion produced by addition of the disclosed polymer to the hydrocarbon fluid has a water content percentage of about 1 to about 95 water, based on total volume of the emulsion. Preferred water content is from about 5 to about 50, about 5 to about 30, or from about 10 to about 20 percent water, based on total volume of emulsion.

In a preferred embodiment, the invention is a method for reducing the apparent viscosity of a hydrocarbon fluid encountered in petroleum operations. The method includes contacting the hydrocarbon fluid with an effective emulsifying amount of a composition comprising at least one hydrophobically modified non-ionic polymer having the general formula below.

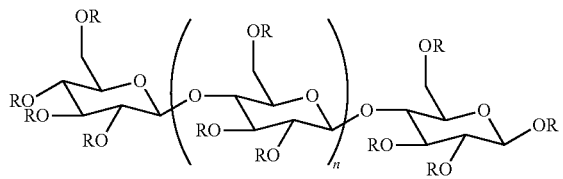

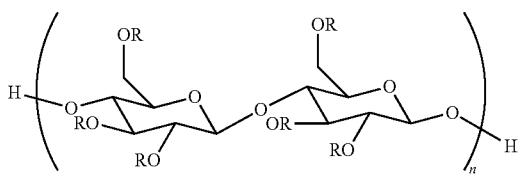

The general formula above has three main components. The first component is the main carbohydrate backbone. Representative carbohydrates include poly-β-glucose, poly-α-glucose, amylose or starch, poly-β-mannose, guar gums, xanthan gums, dextrans, the like, and combinations thereof. Carbohydrate acetal linkages may be of either alpha (α) or beta (β) type and backbone carbohydrates may be any hexose sugar (e.g., glucose, mannose, galactose, the like, and combinations thereof) and may also have varying linkages such as the $^4C_1$ linkage of cellulose or the $^6C_1$ linkage found in the branches of amylose. In addition, modifications such as amino sugars (e.g., glucosamine, mannosamine, the like, and combinations thereof) may also be incorporated. Further, derivatization, such as the acetamides found in chitin, or other common naturally occurring modifications of polysaccharides may also be incorporated.). The second component includes the hydrophilic functionalities (e.g., free hydroxyls from the carbohydrate or alkoxylates such as ethoxylate or propyloxylate). The third component includes the hydrophobic modifiers (e.g., alkyl chains, such as cetyl chains, terminating some of the hydroxyl groups). This third component typically is of at least 4 carbons in length to provide sufficient hydrophobicity relative the degree of substitution on the molecule. In another embodiment, the second and third functionalities may also be combined into a single unit such as 2-hydroxyoctyl groups that have both a hydrophilic hydroxide and a hydrophobic octyl chain or amphophilic materials such as polyethers derived from propylene oxide, ethylene oxide, and the like which typically are terminated with a free hydroxyl group.

Each R in the above general formula is independently selected from the group consisting of H, alkyls, aryls, moieties having alkoxy groups, and combinations thereof, where n is from 5 to 10,000. In an embodiment, a possible structure for the polymer of the invention could be represented by the following.

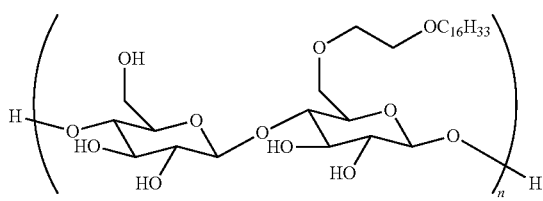

In an embodiment, R has the general formula $(C_2H_4O)_mH$, where m is from 1 to about 25.

In another embodiment, R has the general formula $C_xH_{2x+1}$ and is branched or linear, where x is from about 4 to about 24, or preferably from 8 to 22 or from 12 to 18.

In another embodiment, R is a branched alkyl and has the general formula $C_xH_{2x+1}$, where x is from about 4 to about 24 or preferably from 8 to 24 or from 14 to 18 in the main chain of the branched alkyl. The one or more branches may include, for example, methyl, ethyl, n-propyl, iso-propyl, n-butyl, sec-butyl, dimethyl, and/or diethyl.

In another embodiment, R has the general formula $C_xH_{2x+1}O$ and is branched or linear, where x is from about 4 to about 24, or preferably from 8 to 22 and the oxygen present is a free hydroxyl (OH) that replaces a hydrogen somewhere on the alkyl chain. For example, if x=2 (i.e., $R=C_2H_5O$), a possible structure for the polymer of the invention could be represented by the following.

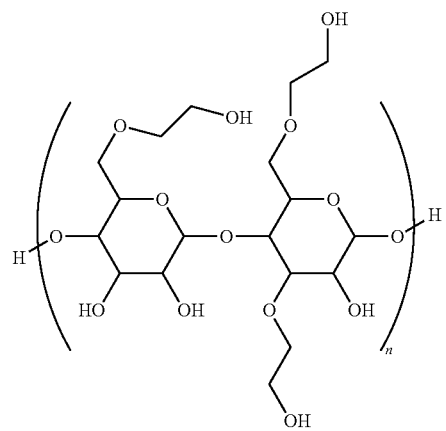

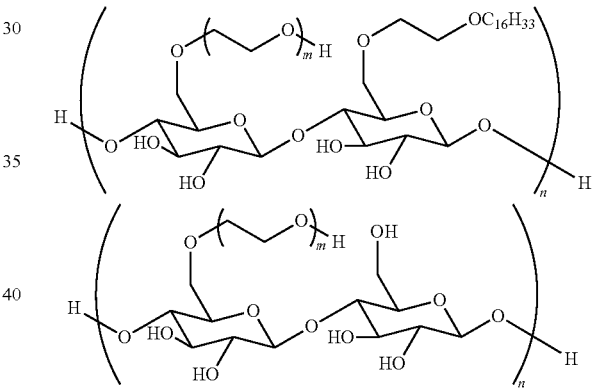

In another embodiment, R has the general formula $(C_2H_4O)_mC_xH_{2x+1}$, where m is from 1 to 5 and x from about 4 to about 24.

In another embodiment, R has the general formula $(C_2H_4O)_mC_xH_{2x+1}O$ and is branched or linear, where m is from 1 to 5 and x is from about 4 to about 24, or preferably from 8 to 22 and the oxygen present is a free hydroxyl (OH) that replaces a hydrogen somewhere on the alkyl chain.

In another embodiment, R is branched and has the general formula $(C_2H_4O)_mC_xH_{2x+1}$, and wherein m is from 1 to 5 and x from about 4 to about 24 in its main chain. The one or more branches may include, for example, methyl, ethyl, n-propyl, iso-propyl, n-butyl, sec-butyl, dimethyl, and/or diethyl.

In a further embodiment, the hydrophobically modified non-ionic polymer is derived from a polysaccharide. Representative polysaccharides include, for example, poly-β-glucose, poly-α-glucose, amylose, starch, poly-β-mannose, guar gums, xanthan gums, dextrans, and/or chitins. In other embodiments, the hydrophobically modified non-ionic polymer is selected from the group consisting of: hydrophobically modified hydroxyethyl cellulose; hydrophobically modified hydroxyethyl guar; hydrophobically modified hydroxyethyl xanthan; hydrophobically modified hydroxyethyl dextran; hydrophobically modified hydroxypropyl cellulose; hydrophobically modified hydroxypropyl guar; hydrophobically modified hydroxypropyl dextran; hydrophobically modified hydroxypropyl xanthan; and combinations thereof.

In one embodiment, the hydrophobically modified non-ionic polymer having the following general formula, and wherein n is from 3 to about 300.

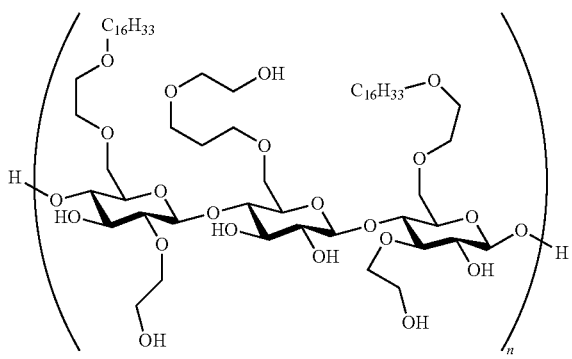

Other representative structures are shown below for the hydrophobically modified non-ionic polymer of the invention include, for example, different backbones, such as poly-α-glucose, different saccharides, such as poly-β-mannose, and different hydroxy capped functionalities, such as 2-hydroxypropyl, butyl, and dodecyl.

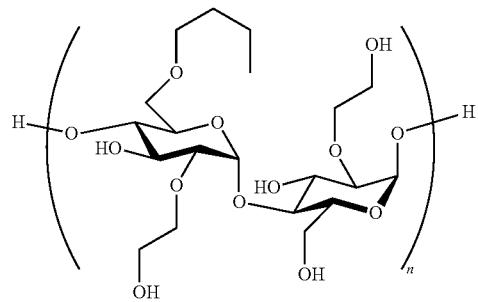

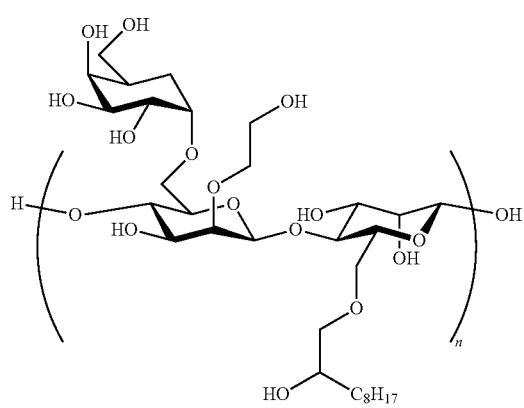

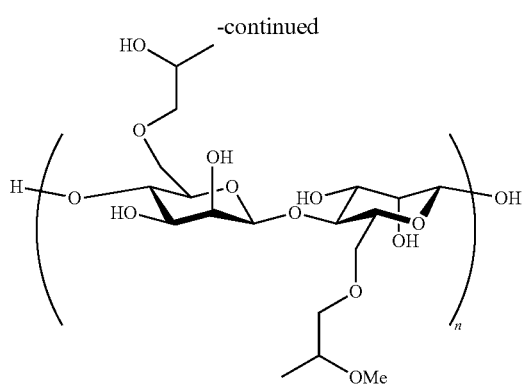

In terms of an emulsifying amount of the disclosed polymer, up to about 200 ppm actives, based on total volume of emulsion, may be used. In another embodiment, a range of actives from about 200 ppm to about 1,000 ppm, based on total volume of emulsion is used. Variation of the dosage may affect emulsion stability over time and would be applicable to the need for both an emulsified fluid and the need for separation at a point downstream.

The invention is envisioned to operate in all applications as related to the oil field (e.g., subterranean reservoir, pipeline, production facility, crude oil mixtures). For example, petroleum operations refer generally to any primary, secondary, and tertiary oil recovery system. In alternative embodiments, the treated hydrocarbon fluid may be any fluid encountered in a petroleum operation. Preferred fluids are oil, gas condensates (e.g., fluids with low boiling at ambient pressure and temperature), or gas.

The method of the invention may be employed by contacting the described polymers with or adding the polymers to the hydrocarbon fluids in a manner known per se. In a preferred method of this invention, the polymers of the invention are added at any point in the flow line upstream from the point at which reduced viscosity is desired. An exemplary technique in primary oil recovery where the method of the invention may employed is the squeeze treating technique, whereby the polymers are injected under pressure into the producing formation, are adsorbed on the strata, and desorbed as the fluids are produced. They can further be added in the water flooding operations of secondary oil recovery as well as be added to pipelines, transmission lines, and refinery units.

In one embodiment, the disclosed composition is injected down the annular space of the well, where polymers contact the produced fluids at the base of the production tubing. In another embodiment, the disclosed composition is added to the produced fluid via slip-stream.

In certain instances, the described polymers may also be formulated with other materials commonly used for treating hydrocarbon fluids and oil in water emulsion encountered in petroleum operations. Such other materials include, but are not limited to corrosion inhibitors, scale inhibitors, surfactants, wax inhibitors, hydrate inhibitors, foamers, defoamers, other treatment formulations, combinations, and the like.

The foregoing may be better understood by reference to the following examples, which are intended for illustrative purposes and are not intended to limit the scope of the invention.

Example 1

Crude oil samples obtained from the Plover Lake region of Canada (approximately: 14.46% saturates; 62.56% aromatics; 13.20% resins; and 9.78% asphaltenes) were treated with twenty percent water and polymer actives as shown in Tables 1a and 1b. Polymer A had the following structure and is the same for each of the below Examples. Polymer A was comprised of (a) hydrophobically capped hydroxyls, (b) hydrophobically capped ethoxylated hydroxyls, (c) ethoxylated hydroxyls, and (d) unmodified sugars in random repeating units.

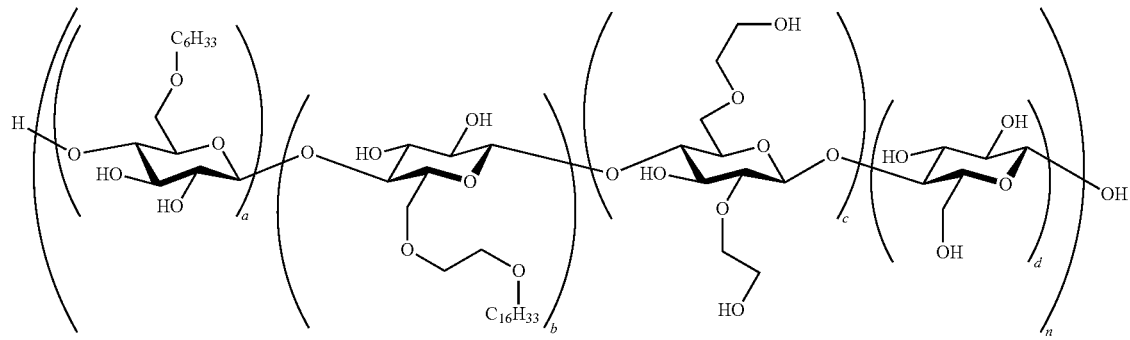

Polymer A (62.5 mg) was dispersed into water (3.75 g) and shaken until it appeared homogenous. The water and polymer solution was then added in one aliquot to a sample of the crude oil (15.0 g) and the resulting mixture was mixed with a shear mixer at 3,000 rpm for 3 minutes. The resulting emulsion was evaluated on a Brookfield viscometer with a #34 spindle for viscosity at 80° F.

Polymer A of the instant invention demonstrated significantly reduced viscosity at a range of chemical dosages (Table 1). Results suggest that Polymer A is effective as a viscosity reducer in a range of 200 ppm to 1,000 ppm. Table 2 contains additional comparative data from testing two different commercially available cellulose polymers. Using a second crude oil sample obtained from a second well in the same oil field and having slightly varied composition, the viscosity reduction of the emulsified fluid was compared against chemical dosage (Table 2). Commercial A was common commercially available cellulose polymers, and Commercial B was a common commercially available polyvinyl alcohol (these comparative products are the same for each of the below Examples).

TABLE 1

Chemical Performance Versus Chemical Dosage

Polymer A

| Dosage, active (ppm) | 1000 | 500 | 200 | 0 |
|---|---|---|---|---|
| Viscosity (cP) | 2,120 | 3,259 | 6,159 | 39,112 |

TABLE 2

Chemical Comparison of Viscosity Reducers

| Chemical | Crude Only | Commercial A | Commercial A | Commercial B | Polymer A |
|---|---|---|---|---|---|
| Dosage, active (ppm) | 0 | 1000 | 200 | 1000 | 1000 |
| Water (%) | 0 | 20 | 20 | 20 | 20 |
| Viscosity - (cP) | 10408 | 1404 | 10738 | 260 | 1866 |

Example 2

One physical property that is deemed critical for oil field application is the polymer inversion temperature in water. The inversion temperature is the temperature above which the polymer hydrophobic domains begin to interact to form a cross-linked network of polymers that is a viscous gel and has a greatly reduced solubility in water. As part of the oil treatment process, the produced fluids from a well are heated in a separation vessel to speed the separation of water from oil. These vessels routinely attain temperatures greater than 50° C. and can be heated to over 120° C., which is often hot enough to trigger the polymer inversion process and cause the inverted polymer to settle to the bottom of the vessel as a precipitate and impede future operation of the separation vessel. Thermal stability testing found Polymer A did not have a detectable inversion temperature in tests up to 95° C. in a laboratory setting, and as such did not form a precipitate, which is imperative for oil field operations.

Example 3

While a variety of chemicals can create the water external emulsion needed for viscosity reduction of heavy oil, the separation of the water from the oil at the end of transportation is also very important. The quality of oil-water separation in the oil field was quantified by a standard bottle test (an exact procedure is not defined by a governing body, the bottle test is a standard practice within the oilfield and generally comprises sampling crude oil, treating with chemical, heating, and monitoring fluid separation over time), which measured the rate of water separation (water drop) and the final dryness of the oil layer (i.e., how effectively the water was removed). In a field evaluation, these characteristics were measured in comparison with a quaternary amine polymer (designated as Quat A in Table 3), Commercial A, and Polymer A.

Legend for Table 3: tr=trace; Water Drop=visible water separated in 100 mL of fluid; Heat is 150° F.; Thief=10 ml fluid drawn at 55% from top of fluid; Water is free water after centrifuge; BS=emulsion layer; Slug=water volume after using slugging chemical to drop all residual emulsified water.

TABLE 3

Bottle test results for VR field tests

| Chemical | Dosage (ppm) | Water Drop (mL) | | | Thief @ 55% | | |
| --- | --- | --- | --- | --- | --- | --- | --- |
| | | 20 min. | 15 min. heat | 90 min heat | Water | BS | slug |
| Commercial A | 1000 | 8 | 20 | 34 | 6 | tr | 6 |
| | 600 | 8 | 20 | 33 | 4.6 | tr | 4.8 |
| | 200 | 8 | 15 | 34 | 2.8 | 0 | 2.8 |
| Quat A | 1000 | 0 | 8 | 30 | 2.4 | 0 | 2.4 |
| | 600 | 8 | 18 | 29 | 6.4 | 0.2 | 7.6 |
| | 200 | 10 | 20 | 29 | 6.4 | tr | 7 |
| Polymer A | 1000 | tr | 10 | 32 | 1.6 | 0 | 1.6 |
| | 600 | tr | 18 | 34 | 1.8 | 0 | 1.8 |
| | 200 | tr | 18 | 31 | 1.8 | tr | 2 |
| Blank | | 0 | 0 | 1 | 10 | 21.5 | 0 | 22 |

The test results described in Table 3 represent a set of standard bottle tests in which oil was mixed with a solution of the prescribed chemical and twenty percent water (100 ml total), heated to 130° F. and shaken 100 times. The bottles were left to rest at ambient temperature for twenty minutes, and water drop was measured. After this time, the samples were dosed with 300 ppm of an emulsion breaker chemical and heated to 150° F. for 90 minutes. At the prescribed time intervals the amount of free water in the bottom of the bottles was quantified visually. At the completion of the water drop test all bottles were thiefed at the 55 mL mark of the bottle by drawing 10 mL of fluid into a syringe with a thiefing needle. The thiefed fluids were then treated by a standard grind-out procedure to determine the residual water and residual emulsion in the oil.

The bottles dosed with Polymer A did not drop water during the twenty minute period at room temperature, but after treatment with emulsion breaker chemistry and addition of heat the water rapidly separated from the produced oil and showed enhanced separation over the blank bottle with no viscosity reducer chemical. These results indicate that the Polymer A is able to create a stable oil-in-water emulsion under field conditions, a condition necessary for effective viscosity reduction and production enhancement. Even more critically, after treatment with emulsion breaker chemical, the emulsion can be resolved back to water and dry oil. The ability to create and destroy an emulsion on demand is an essential element of this type of viscosity reducer application.

The results of the grindout test in Example 3 demonstrated that even though both Commercial A and Polymer A outperformed Quat A during the water drop portion of the bottle test, fluid treated with Polymer A resulted in much drier oil than either Commercial A or Quat A based on the grindout.

Example 4

The ultimate goals of a viscosity reducer are to enhance oil production and minimize equipment requirements as well as wear on the equipment. To increase oil production, an amount of water has to be added to create the water external emulsion. The amount of water required, however, can impact the performance of the separation equipment at the process units. In addition, large volumes of water can be difficult to deliver to the site needed for a viscosity reduction application. It is of great advantage to minimize the amount of water required for viscosity reduction. Polymer A was evaluated for emulsification of oil with different amounts of water and varying chemical dosage and showed the ability to create oil-in-water emulsions at a range of water cuts (Table 4).

TABLE 4

Water External Emulsions with Polymer A

| Chemical Dosage (ppm) | Water Cut (%) | Water Drop (mL) | | |
| --- | --- | --- | --- | --- |
| | | 20 min. | 60 min. | 90 min. |
| 1000 | 20 | 2 | 3 | 0 |
| | 15 | trace | trace | trace |
| | 10 | 0 | 0 | 0 |
| 600 | 20 | 8 | 10 | 5 |
| | 15 | 1 | 3 | 3 |
| | 10 | 0 | trace | trace |
| 200 | 20 | 19 | 20 | 15 |
| | 15 | 2 | 8 | trace |
| | 10 | 0 | trace | trace |

The test results in Table 4 represent a bottle test without emulsion breaker chemistry and evaluation of free water break-out over time. The bottles were mixed, shaken 100 times, allowed to stand for sixty minutes, shaken an additional 100 times, and allowed to stand for an additional thirty minutes. Results show that the amount of water can range between twenty and ten percent and still obtain a stable emulsion with minimal free water.

Example 5

Additional evaluation of the performance of Polymer A in a flow loop shows that the emulsified fluids flowed better than the produced oil alone and with similar flow volumes to those of Commercial A and B and Quat A (FIG. 1). The flow loop test was conducted by adding water and chemical to oil and mixing with an overhead stirrer prior to using a progressing cavity pump to pump the mixed fluids through an eight foot long flow loop fitted with a 40 psi backpressure check valve at the end to maintain a constant pressure. Fluids were pumped continuously through the loop for a minimum of one minute prior to measurement.

In FIG. 1, note that Commercial B has the lowest pump rate for either chemical dosage. Each of the other chemistries demonstrates pump rate increases with lower chemical dosage and all have similar pump rate values. The Commercial A material had also been run in duplication (not in graph) and all data appears to be reproducible within ten percent.

Example 6

Figure 2:
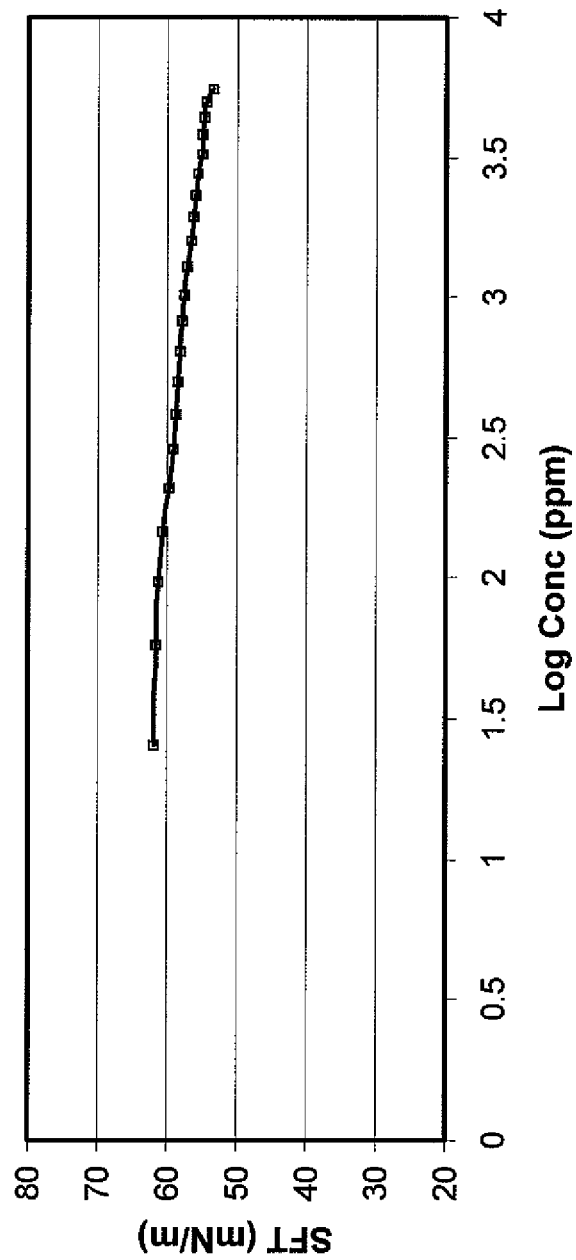
FIG. 2 shows test results for surface tension of Polymer A using two different sources of crude oil.

The mode of action for Polymer A to work as an emulsifier can be indirectly detected by surface tension and interfacial tension measurements. The reduction of a water droplet's surface tension by addition of Polymer A indicates that the chemical is migrating to the water/air interface and disrupting the hydrogen bonding forces of the water droplet at the interface. Test results for such surface tension using two different sources of crude oil are shown in FIG. 2. Surface tension is essentially saturated very quickly at a low dosage of chemical as indicated by minimal change in the surface tension while raising the concentration of chemical two orders of magnitude.

Example 7

Figure 3:
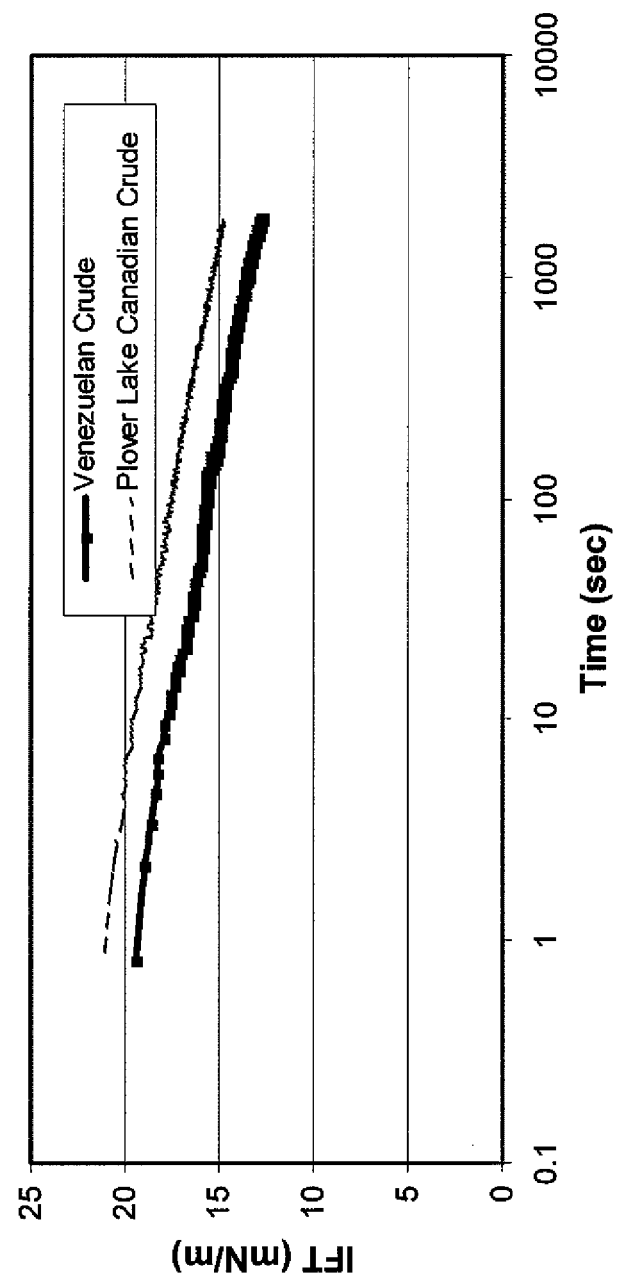
FIG. 3 shows test results for interfacial tension measurements of Polymer A.

A similar type of behavior as that seen in surface tension measurements was observed in interfacial tension measurements between water and crude oil with the addition of Polymer A. In the interfacial tension case with oil present as the second fluid there was a much more substantial drop in the tension values as compared to the values when air was the second fluid. This suggests that the hydrophobic domains of Polymer A interact stronger with the oil and allow additional polymer interaction at the interface. Results for interfacial tension measurements are shown in FIG. 3. Interfacial tension measurements were taken with 1,000 ppm of Polymer A in solution with volume reading at one second intervals until a state of equilibrium was reached to determine the equilibrium state interfacial tension.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, any exemplary list herein provided should be interpreted to include any combination of listed items.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible and should all be understood to include the term "about." Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method for reducing the apparent viscosity of a hydrocarbon fluid comprising heavy crude oil encountered in petroleum operations having an American Petroleum Institute (API) gravity of about 20 or less, the method comprising:
   (i) contacting said hydrocarbon fluid with an effective emulsifying amount of a composition comprising at least one hydrophobically modified non-ionic polymer having the general formula below:

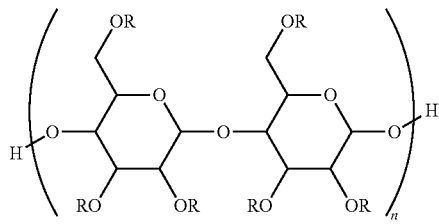

wherein each R is independently hydrogen, an alkyl group, an aryl group, an hydroxyalkyl group, or an alkoxy group, and n is from 5 to 5,000; and
   (ii) creating a water external emulsion comprising the hydrocarbon fluid and the composition wherein the water external emulsion has a lower apparent viscosity than the hydrocarbon fluid.

2. The method of claim 1, wherein each R is an alkyl group, the alkyl group independently being a linear alkyl, or a branched alkyl.

3. The method of claim 1, wherein R is selected from the group consisting of: a group having the general formula $(C_2H_4O)_mH$, wherein m is from 1 to about 5; a group having the general formula $C_xH_{2x+1}$, wherein x is from about 4 to about 24; a branched alkyl having the general formula $C_xH_{2x+1}$, wherein x is from about 4 to about 24 in the main chain of the branched alkyl; a group having the general formula $(C_2H_4O)_mC_xH_{2x+1}$, wherein m is from 1 to 5 and x from about 4 to about 24; a branched group having the general formula $(C_2H_4O)_mC_xH_{2x+1}$, wherein m is from 1 to 5 and x from about 4 to about 24 in its main chain; a group having the general formula $C_xH_{2x+1}O$, wherein x is from about 4 to about 24 and the O is a free OH group replacing a hydrogen; a group having the general formula $(C_2H_4O)_mC_xH_{2x+1}O$, wherein m is from 1 to 5 and x is from about 4 to about 24 and the O is a free OH group replacing a hydrogen; and combinations thereof.

4. The method of claim 1, wherein the hydrophobically modified non-ionic polymer is derived from a polysaccharide.

5. The method of claim 4, wherein the polysaccharide is selected from the group consisting of: poly-α-glucose; poly-β-glucose; poly-β-mannose; poly-β-glucosamine; poly-(N-acetyl)-β-glucosamine; amylase; glycogen; cellulose; starches; guar gums; xanthan gums; dextran; chitosan; chitin; and combinations thereof.

6. The method of claim 1, wherein the hydrophobically modified non-ionic polymer has the following general formula, and wherein n is from 1 to about 1,000; a is from 0 to about 25; b is from 0 to about 25; c is from 0 to about 25; and d is from 0 to about 25,

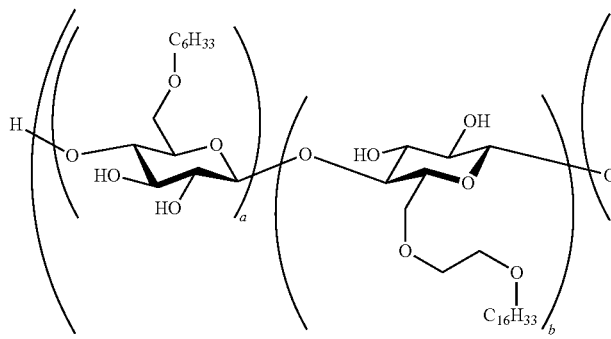
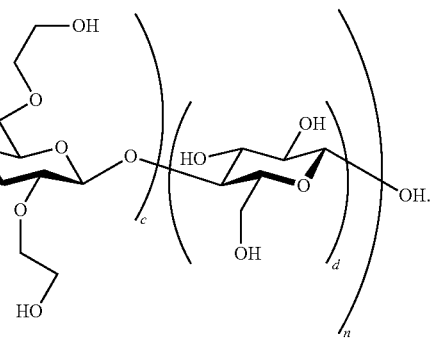

7. The method of claim 6, wherein n is from 5 to about 2,000; a is from 1 to 5; b is from 1 to 5; c is from 1 to 5; and d is from 1 to 5.

8. The method of claim 1, wherein the hydrophobically modified non-ionic polymer is selected from the group consisting of: hydrophobically modified hydroxyethyl cellulose; hydrophobically modified hydroxyethyl guar; hydrophobically modified hydroxyethyl xanthan; hydrophobically modified hydroxyethyl dextran; hydrophobically modified hydroxypropyl cellulose; hydrophobically modified hydroxypropyl guar; hydrophobically modified hydroxypropyl dextran; hydrophobically modified hydroxypropyl xanthan; and combinations thereof.

9. The method of claim 1, wherein the hydrophobically modified non-ionic polymer is comprised of monomeric units linked together via an acetal linkage.

10. The method of claim 1, wherein the hydrophobic alkyl moieties are 2-hydroxyalkyl ethers endcapping hydroxyl groups.

11. The method of claim 1, wherein the hydrophobically modified non-ionic polymer has an inversion temperature of about 40° C. or wherein the hydrophobically modified non-ionic polymer has no inversion temperature at atmospheric pressure.

12. The method of claim 1, wherein the hydrophobically modified non-ionic polymer has a surface tension of lower than 65 mN/m in water at under 100 ppm active concentration.

13. The method of claim 1, further comprising separating the water external emulsion via a method selected from the group consisting of: heating; addition of an emulsion breaker chemicals; addition of specialized oxidizers; addition of enzymes; and combinations thereof.

14. The method of claim 1, further comprising separating the water external emulsion via addition of a polysaccharide breaker.

15. The method of claim 1, wherein contacting said hydrocarbon fluid with the effective emulsifying amount of the composition comprising at least one hydrophobically modified non-ionic polymer results in the water external emulsion having from about 1 to about 50 percent water, based on total volume of the emulsion.

16. The method of claim 1, wherein the effective emulsifying amount of the composition is up to about 1,000 ppm actives, based on total volume of emulsion.

17. The method of claim 1, wherein the composition is delivered into a subterranean formation.

18. A method of reducing deposits within a well annulus or a pipeline, the method comprising:
  (i) contacting a hydrocarbon fluid comprising heavy crude oil encountered in petroleum operations having an API gravity of about 20 or less within the well annulus or the pipeline with an effective amount of a composition comprising at least one hydrophobically modified non-ionic polymer having the general formula below:

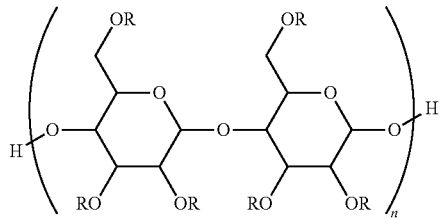

wherein each R is independently hydrogen, an alkyl group, an hydroxyalkyl group, or an alkoxy group, and n is from 5 to 5,000; and
  (ii) creating a water external emulsion comprising the hydrocarbon fluid and the composition wherein the water external emulsion has a lower apparent viscosity than the hydrocarbon fluid.

19. The method of claim 1, wherein the water external emulsion comprises a complex water external emulsion.

20. A method for reducing the apparent viscosity of a hydrocarbon fluid comprising heavy crude oil encountered in petroleum operations having an American Petroleum Institute (API) gravity of about 20 or less, the method comprising:
  (i) contacting said hydrocarbon fluid with an effective emulsifying amount of a composition comprising at least one hydrophobically modified non-ionic polymer having the general formula below:

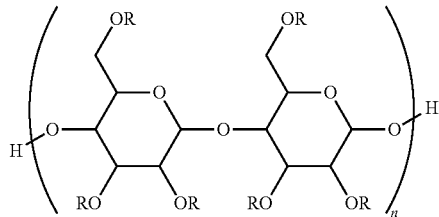

wherein each R is independently selected from the group consisting of H, a group having the general formula $(C_2H_4O)_mH$, wherein m is from 1 to about 5; a group having the general formula $C_xH_{2x+1}$, wherein x is from about 4 to 14; a branched alkyl having the general formula $C_xH_{2x+1}$, wherein x is from about 4 to 14 in the main chain of the branched alkyl;

a group having the general formula $(C_2H_4O)_m C_x H_{2x+1}$, wherein m is from 1 to 5 and x from about 4 to 14; a branched group having the general formula $(C_2H_4O)_m C_x H_{2x+1}$, wherein m is from 1 to 5 and x from about 4 to 14 in its main chain; a group having the general formula $C_x H_{2x+1} O$, wherein x is from about 4 to 14 and the O is a free OH group replacing a hydrogen; a group having the general formula $(C_2H_4O)_m C_x H_{2x+1} O$, wherein m is from 1 to 5 and x is from about 4 to 14 and the O is a free OH group replacing a hydrogen; and any combination thereof, and (ii) creating a water external emulsion comprising the hydrocarbon fluid and the composition wherein the water external emulsion has a lower apparent viscosity than the hydrocarbon fluid.

\* \* \* \* \*